May 28, 1957     J. I. HAMER     2,793,649
SELF-EMPTYING DIAPHRAGM DRAIN VALVE
Filed May 19, 1954
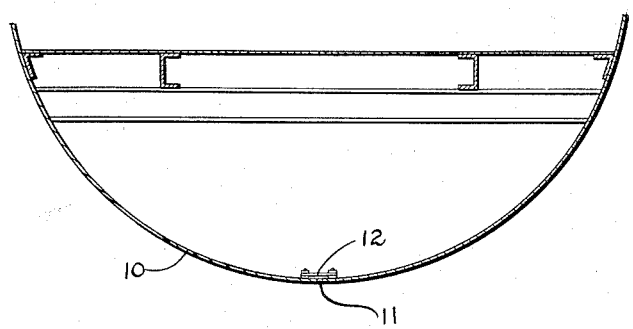
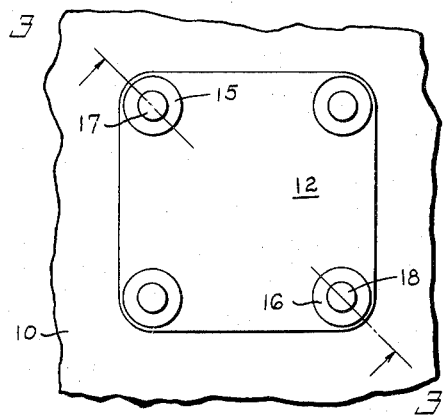
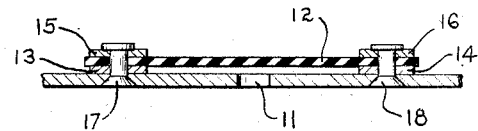
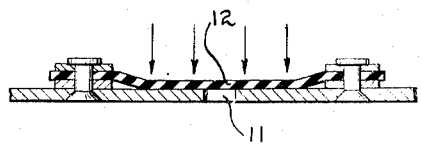
JAMES I. HAMER
INVENTOR.
BY Hubert Miller
ATTORNEY

2,793,649
SELF-EMPTYING DIAPHRAGM DRAIN VALVE

James I. Hamer, Seattle, Wash., assignor to Boeing Airplane Company, Wichita, Kans., a corporation of Delaware Application May 19, 1954, Serial No. 430,907

2 Claims. (Cl. 137—204)

This invention relates generally to drain valves and more particularly to an automatic drain valve for draining condensate from pressurized aircraft cabins.

In internally pressurized aircraft flying at high altitude, the temperature of the fuselage skin defining the pressurized cabin or other pressurized compartment is often as low as minus 65° F. While the temperature of cabin air is normally maintained at around 70° F. During flight condensate in considerable quantity accumulates on the inner wall surface of the cold fuselage skin, and continuously drains to a low point in that compartment. Over a prolonged period, much of the condensate which accumulates on the inner skin surface freezes. Shortly after the aircraft lands, there is a very considerable quantity of condensate which accumulates over a considerable surface area of the bottom of the pressurized compartment. Leaving that condensate in the compartment or cabin while the plane is on the ground increases the humidity of cabin air due to evaporation, and consequently magnifies the condensate problem for the next flight. Such condensate should, therefore, be free to drain from the compartment as soon as it is depressurized and during the time the plane is on the ground.

Since any drain valve used for disposing of accumulated condensate must be installed directly on the fuselage skin, drain valves of conventional design are not considered suitable for this purpose. Most such valves must be operated manually which only adds to the work of the ground crews.

It is a primary object of this invention to provide a yieldable deformable membrane type valve which presents a very minor installation problem, which will automatically close to prevent loss of cabin air during the time the cabin is pressurized, yet which will automatically open to allow drainage of condensate from the compartment as soon as the compartment is depressurized.

The invention will be more clearly understood when the following description is read in connection with the accompanying drawings, in which:

Fig. 1 is a fragmentary sectional view of an aircraft cabin with the valve of this invention installed at a low point therein;

Fig. 2 is a plan view of the valve installed on the fuselage skin of a pressurized compartment, the skin being shown fragmentarily; and Figs. 3 and 4 are sectional views taken along the line 3—3 of Fig. 2, and illustrating the valve in both open and closed positions respectively.

In the drawings, the numeral 10 indicates the fuselage skin which normally defines the pressurized cabin of the airplane. A drain aperture 11 is provided in the skin.

The valve proper includes a membrane 12 overlying the aperture 11 and extending well beyond the periphery thereof in all lateral directions. This membrane is preferably made of a tough but yieldable sheet material, such as neoprene, rubber, or a resinous material. Membrane 12 is held under slight tension in a position spaced from but closely adjacent to the inner surface of skin 10. To this end a plurality of perforated spacers 13 and 14 are positioned between the membrane and the adjacent skin surface at spaced intervals around the marginal portion of the membrane, as clearly shown in Fig. 2. A corresponding number of similarly dimensioned washers 15 and 16 are positioned with their apertures in registry with the apertures in the spacers 13 and 14. Countersunk head rivets 17 and 18 are passed through the skin 10, through the spacers 13 and 14, through membrane 12, and through washers 15 and 16, and are upset from the inside after the membrane has been properly tensioned. The rivets 17 and 18 thus hold the spacers firmly in place against the skin, and force the washers to grip the marginal edges of the membrane 12 to normally maintain the membrane in spaced relation to the skin, as shown in Fig. 3.

When pressurization of an aircraft cabin equipped with this type of valve begins, membrane 12 is forced downward against skin 11 by the air pressure and thus seals aperture 11 to prevent loss of cabin air. When the airplane again descends to a low altitude and the cabin is depressurized, the tension of membrane 12 returns it to the Fig. 3 position, and condensate which has accumulated in the pressurized compartment passes between the various spacers 13 and 14, beneath the membrane 12, and runs out through the aperture 11.

From the above description, it will be seen that the invention provides a drain valve which is installed in such a manner that it does not in any way interfere with the smooth flow of air along the outer skin surface of the fuselage skin. It is a valve which operates automatically and thus relieves the ground crew of any work in draining condensate from the pressurized compartment of the plane. It is easily and quickly installed, and is long lived because it has no operating parts subject to wear by friction.

Having described the invention with sufficient clarity to enable those familiar with this art to construct and use it, I claim:

1. A condensate drain valve for a pressurized compartment which has a bottom wall, comprising: a relatively minute gravity drain aperture in said wall; a sheet of yieldable material overlying said aperture and the immediately surrounding material which defines it; spacers surrounding the aperture and secured to the surrounding wall material at intervals around the margin of said sheet between the sheet and the adjacent wall surface; and means securing adjacent marginal portions of the sheet to said spacers to normally suspend the sheet above the aperture in juxtaposed and substantially parallel position with relation to the wall surface immediately surrounding the aperture.

2. A normally open pressure closed drain valve for a compartment having a bottom wall comprising: a drain aperture in said wall; an air pressure deformable membrane bridging said aperture and overlying the wall material immediately surrounding it; spacers between the peripheral margin of the membrane and the wall at spaced intervals around the aperture; and means securing the spacers to the wall and to marginal portions of the membrane to normally hold the membrane in closely spaced relation to the wall surface immediately surrounding the aperture whereby liquid may normally pass between the spacers and between the adjacent surfaces of the wall and the membrane and out through the aperture, but is bocked from doing so when the membrane is deformed by air pressure into face to face sealing contact with the surface of the wall material immediately surrounding the aperture.

References Cited in the file of this patent

UNITED STATES PATENTS

| | | |
|---|---|---|
| 2,598,274 | Krueger | May 27, 1952 |
| 2,646,059 | Wittner et al. | July 21, 1953 |
| 2,674,262 | Bradshaw | Apr. 6, 1954 |
| 2,730,115 | Hempel | Jan. 10, 1956 |

FOREIGN PATENTS

| | | |
|---|---|---|
| 545,646 | Germany | Mar. 4, 1932 |